US011528289B2

(12) United States Patent
Soryal et al.

(10) Patent No.: US 11,528,289 B2
(45) Date of Patent: Dec. 13, 2022

(54) SECURITY MECHANISMS FOR CONTENT DELIVERY NETWORKS

(71) Applicant: AT&T Intellectual Property I, L.P., Atlanta, GA (US)

(72) Inventors: Joseph Soryal, Glendale, NY (US); Dylan C. Reid, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 2 days.

(21) Appl. No.: 17/187,645

(22) Filed: Feb. 26, 2021

(65) Prior Publication Data
US 2022/0279000 A1 Sep. 1, 2022

(51) Int. Cl.
H04L 9/40 (2022.01)
H04L 9/06 (2006.01)
G06N 5/04 (2006.01)
H04L 67/02 (2022.01)
H04L 67/10 (2022.01)
G06N 20/00 (2019.01)
G06F 16/955 (2019.01)
G06F 16/951 (2019.01)

(52) U.S. Cl.
CPC ........ H04L 63/1425 (2013.01); G06F 16/951 (2019.01); G06F 16/955 (2019.01); G06N 5/04 (2013.01); G06N 20/00 (2019.01); H04L 9/0643 (2013.01); H04L 63/1466 (2013.01); H04L 67/02 (2013.01); H04L 67/10 (2013.01); H04L 2463/145 (2013.01)

(58) Field of Classification Search
None
See application file for complete search history.

(56) References Cited

U.S. PATENT DOCUMENTS

| | | | | |
|---|---|---|---|---|
| 6,891,029 | B2 * | 5/2005 | Zhang | C07K 14/575 435/69.3 |
| 8,510,237 | B2 * | 8/2013 | Cascaval | G06F 40/143 706/12 |
| 9,674,258 | B2 * | 6/2017 | Wei | H04L 67/02 |
| 10,334,016 | B2 * | 6/2019 | Wei | H04L 67/02 |
| 10,972,573 | B1 * | 4/2021 | Lepeska | H04L 67/5681 |
| 2007/0288588 | A1 * | 12/2007 | Wein | H04L 67/1001 709/214 |

(Continued)

Primary Examiner — Lashonda Jacobs-Burton
(74) Attorney, Agent, or Firm — Hartman & Citrin LLC

(57) ABSTRACT

Security mechanisms for content delivery networks ("CDNs") are disclosed herein. One security mechanism can be used to mitigate or prevent dynamic content attacks. A system can execute a CDN manager to perform operations. In particular, the CDN manager can receive a plurality of hypertext transfer protocol ("HTTP") requests, and parse a plurality of headers from the plurality of HTTP requests to determine a plurality uniform resource locators ("URLs"). The CDN manager can generate a plurality of web page images associated with the plurality of URLs. The CDN manager can execute a machine learning algorithm, such as a convolution neural network, to perform an analysis of the plurality of web page images. Based upon the analysis of the plurality of web page images, the CDN manager can determine whether the plurality of HTTP requests are for the same web page, which can be indicative of a dynamic content attack.

20 Claims, 14 Drawing Sheets

(56) References Cited

U.S. PATENT DOCUMENTS

| | | | |
|---|---|---|---|
| 2014/0289319 A1* | 9/2014 | Richardson | G06F 16/955 709/203 |
| 2015/0169177 A1* | 6/2015 | Zhao | G06F 16/583 715/838 |
| 2015/0310126 A1* | 10/2015 | Steiner | G06F 16/9574 715/204 |
| 2016/0191600 A1* | 6/2016 | Scharber | H04L 41/145 709/223 |

* cited by examiner

SECURITY MECHANISMS FOR CONTENT DELIVERY NETWORKS

BACKGROUND

A content delivery network ("CDN") is a distributed network of proxy servers that deliver web content, such as web pages, downloadable media, streaming media, and the like, collected from backend web servers using a temporary local storage known as a cache. CDNs enable content providers to distribute content quickly, efficiently, and with reduced latency compared to a centralized content distribution model such as utilized by standalone web servers. With the latest cloud technologies, CDNs can quickly adapt to increases in the demand for content. Like other Internet technologies, CDNs are subject to various security vulnerabilities.

CDNs utilize a process called hypertext transfer protocol ("HTTP") caching to temporarily store copies of web content on geographically distributed CDN cache servers to enable the CDN to respond to requests from local user devices. Content then can be delivered to the local user devices with lower latency and reduced bandwidth use. In recent years, attackers have exploited HTTP caching through cache poisoning, in which an attacker can insert malicious content into a CDN cache server for legitimate users to access until the cache expires or is deleted. In this manner, the attacker can insert malicious content once and have the web server propagate the malicious content to one or more CDNs that, in turn, propagate the malicious content to reach multiple end users.

CDNs also are vulnerable to dynamic content attacks (also sometimes referred to as "dynamic HTTP flood attacks"). Since dynamic content is not typically stored on CDN servers, CDNs can redirect HTTP requests for dynamic content to the origin web server. Attackers can take advantage of this behavior and can generate attack traffic that contains random parameters in HTTP GET requests. CDN servers immediately redirect this attack traffic to the origin server, expecting the origin server to handle the requests. In many cases, however, the origin server does not have the capacity to handle the requests, which results in a failure to provide online services to legitimate users, and thereby creates a denial-of-service scenario. Many CDNs have the ability to limit the number of dynamic requests to the server that is under attack. This means that the CDN cannot distinguish attackers from legitimate users and the rate limit will result in legitimate users being blocked.

Many websites utilize HTML code called a tracking pixel (also referred to as a 1×1 pixel or pixel tag) to acquire and analyze data about users. Typically, this information is used by companies to perform website analytics and targeted advertising. Attackers can exploit tracking pixels by illegal insertion into web pages stored in the CDN. Since the tracking pixel is difficult if not impossible for a user to detect with the naked eye, users may access web pages infected by illegal tracking pixels without suspicion, and the attacker can obtain data about the device, application, and IP address used to access an infected web page.

The proliferation of digital content consumption has dramatically increased the use of CDNs to the point of ubiquity. Although the benefits of CDNs are many, CDNs have multiple vulnerabilities that can be exploited by attackers. CDN providers must implement mechanisms to eliminate or at least reduce the impacts of these vulnerabilities.

SUMMARY

Concepts and technologies disclosed herein are directed to security mechanisms for CDNs. According to one aspect of the concepts and technologies disclosed herein, a system, such as a web server, can include one or more processors and a memory that includes instructions of a CDN manager that, when executed by the processor(s), cause the processor(s) to perform operations. In particular, the CDN manager can receive a plurality of hypertext transfer protocol ("HTTP") requests, and parse a plurality of headers from the plurality of HTTP requests to determine a plurality of uniform resource locators ("URLs"). The URLs can identify a web resource such as specific web page. The CDN manager can generate a plurality of web page images associated with the plurality of URLs. The CDN manager can execute a machine learning algorithm, such as a convolution neural network, to perform an analysis of the plurality of web page images. Based upon the analysis of the plurality of web page images, the CDN manager can determine whether the plurality of HTTP requests are for the same web page, which can be indicative of a dynamic content attack.

Based upon the analysis of the plurality of web page images, the system can determine that the plurality of HTTP requests are for the same web page. This behavior is indicative of a dynamic content attack, and so the system can determine that the HTTP requests are malicious. The system can then provide a web page code associated with the plurality of web page images into a hash function to create a hashed web page code. The system can distribute the hashed web page code to a CDN. Separately, the system can distribute the hash function to the CDN. In some instances, the plurality of HTTP requests may be redirected from at least one CDN.

Based upon the analysis of the plurality of web page images, the system can determine that the plurality of HTTP requests are for different web pages. This behavior is indicative of normal operation, and so the system can determine that the plurality of HTTP requests are legitimate.

In some embodiments, the CDN manager can execute a user device simulator to simulate a user device to access the plurality of URLs identified in the plurality of HTTP requests. The system can generate the plurality of web page images associated with the plurality of URLs by causing the user device simulator to generate the plurality of web page images associated with the plurality of URLs.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
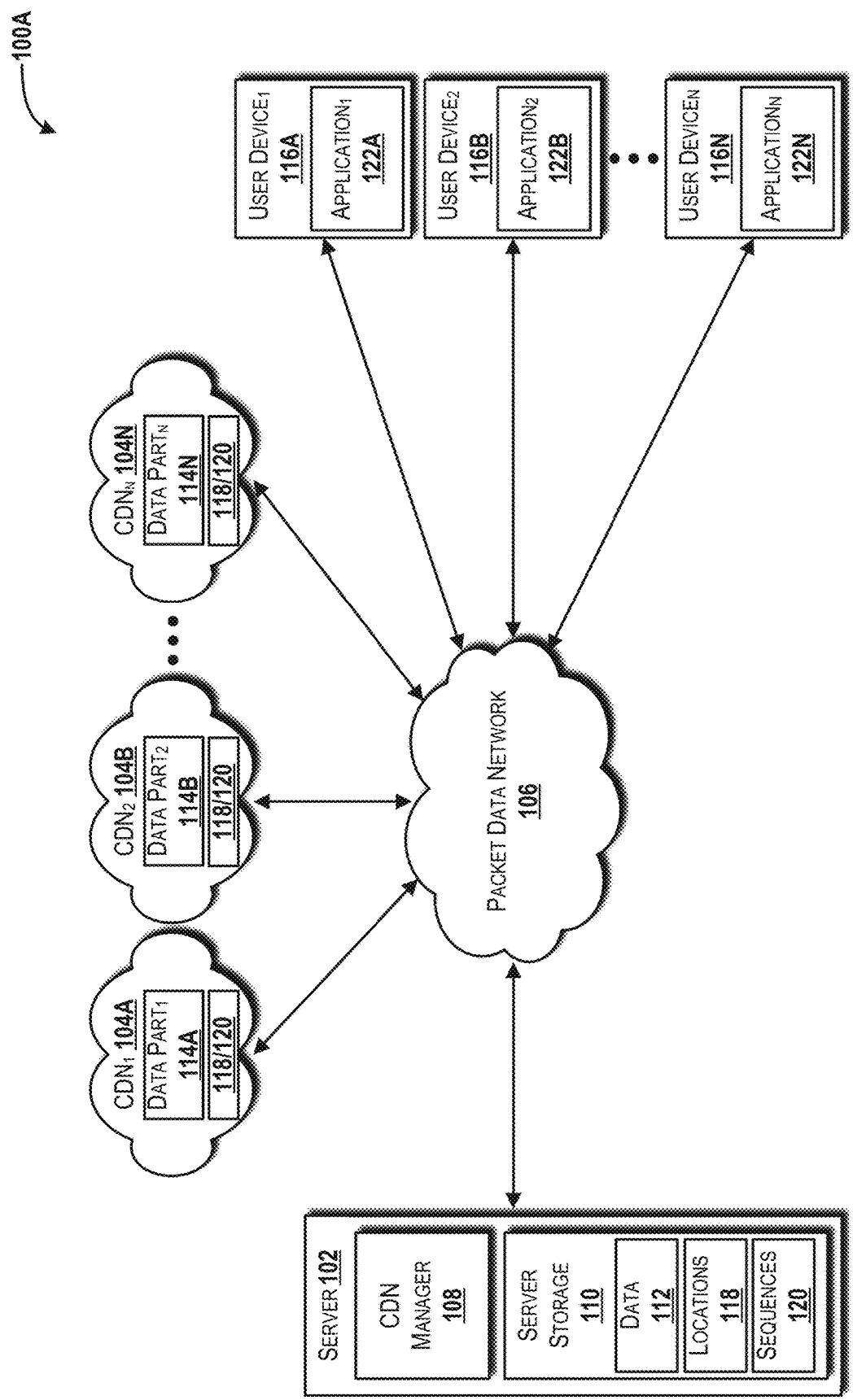
FIG. 1A is a block diagram illustrating an illustrative operating environment in which a security mechanism to mitigate or prevent CDN cache poisoning can be implemented in accordance with various embodiments of the concepts and technologies described herein.

The concepts and technologies disclosed herein are directed to security mechanisms for CDNs. In particular, the following disclosure provides solutions to protect against cache poisoning, dynamic content attacks (also known as "dynamic HTTP flood attacks"), and the illegal insertion of tracking pixels and other malicious code into web pages. A common component of the security mechanisms disclosed herein is a novel application referred to as a CDN manager. The CDN manager can be implemented as an application installed on a web server. The application can be a microservice, an embedded application, or other application type. In some embodiments, the web server that the CDN manager is installed on is the same as the web server that serves data (e.g., web page, image file, video file, other file, and the like) to various geographically distributed CDNs. Alternatively, the CDN manager can be installed on a separate web server or other system that operates in communication with the web server that serves such data.

According to one security solution disclosed herein, the CDN manager can divide the data into a plurality of parts and can distribute the parts among a plurality of CDNs that serve a certain geographical area. The CDN manager can distribute the data parts such that the data part(s) to be downloaded first, or the data parts that require a longer processing time, such as might be the case with high resolution image files, are cached at the CDN that is closer to the majority of users. The CDN manager can inform the CDNs of the locations and sequences of the data parts so that if a user requests a web page from the nearest CDN, that CDN knows from which CDN(s) to collect the remaining data parts. After all data parts are collected, the CDN can send the combined data parts (i.e., as the requested web page or other web resource) to the user. This security mechanism will make it difficult for attackers to poison CDN caches because the whole web page is not available for an extended period of time as one piece of data in one CDN. The attacker would need to compromise all CDNs that contain parts of the web page and maliciously manipulate each of the CDNs. This is more difficult than manipulating the current architecture where a web page is cached on one CDN that can be targeted for cache poisoning, and thus it is unlikely that an attacker would be compelled to attack CDNs that incorporate this security solution.

According to another security solution disclosed herein, the CDN manager can be used to protect against dynamic content attacks. In particular, the CDN manager can analyze incoming HTTP requests (including HTTP and HTTPS requests) using quick image processing before sending the requested content (e.g., a web page) to the CDNs. The quick image processing can be performed using machine learning algorithms such as, but not limited to, algorithms in the convolution neural networks ("CNN") algorithm family. This quick image processing allows the CDN manager to determine if the content requested in multiple HTTP requests is the same or not. In this solution, the CDN manager effectively simulates the role of the end user device and views what the end user would view if the end user were to receive the requested content. For example, a web server would normally respond to an HTTP request for the web page located at URL www.testpage.com with the code for that web page, but in the proposed solution, the CDN manager can assume, temporarily, the role of the end user device and can generate a web page image for a neural network (e.g., CNN) to analyze to determine if the requested web page is the correct web page. Since during an attack the web server may receive numerous HTTP requests with slight variations, such as a variation to the URL suffix, for example, the CDN manager, via image processing performed by the CNN, can isolate and ignore malicious HTTP requests. The CDN manager can hash the HTML code of the correct web page and distribute the unique code to the CDNs. Separately, the CDN manager can direct the CDNs to use a secret hash algorithm to run the HTML code. Any manipulation or slight change to the HTML code will result in a different hash.

The CDN manager can also be used to detect illegal insertion of tracking pixels or other malicious code. In particular, the CDN manager can hash the HTML and other web page code of each website and can distribute the hash results in a distributed ledger that contains the hash functions for each page in the website. The CDN manager also can send the hash results to various hosting CDNs and track any changes of the hash function in case a web page gets changed or updated. All transactions/hash values can be recorded in the distributed ledger and sent out to various nodes so that no node can unilaterally change the values. Before a CDN responds to an HTTP request for a web page, the CDN can compare the hash value it obtains versus what is stored in the distributed ledger. The distributed ledger can also be dispatched to the client (e.g., web browser executed on an end user device) when the client attempts to connect to the website. The client can perform periodic or random checks to ensure the hash values of the web pages being visited match the value contained in the distributed ledger. Before a web page is sent from a CDN or server, the CDN manager can emulate the client, execute the HTML code of the web page, and emulate user interaction with the web page (e.g., the user clicking on a particular element). For example, the user clicking on a particular element may trigger hidden processes and/or try to reach a foreign server such as might be the case if a tracking pixel has been illegally inserted into the web page. This implementation in static web pages does not require extensive processing; however, for the dynamic web content, this implementation can be performed either at the service side or the client side based on where the dynamic content is parsed.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for security mechanisms for CDNs will be described.

Referring now to FIG. 1A, aspects of an illustrative operating environment 100A in which a security mechanism to mitigate or prevent CDN cache poisoning can be implemented will be described. It should be understood that the operating environment 100A and the various components thereof have been greatly simplified for purposes of discussion. Accordingly, additional or alternative components of the operating environment 100A can be made available without departing from the embodiments described herein.

The operating environment 100A includes a server 102 such as an originating web server (also known as an "origin server") operating in communication with a plurality of CDNs 104A-104N (referred to herein collectively as CDNs 104 or individually as CDN 104) via a packet data network ("PDN") 106 such as the Internet. The illustrated server 102 includes a CDN manager 108 that can be used to implement a security mechanism to mitigate or prevent CDN cache poisoning. The CDN manager 108 can be an application executed by one or more processors (best shown in FIG. 8) of the server 102. In some embodiments, the CDN manager 108 can be an embedded application. In other embodiments, the CDN manager 108 can be a microservice. Although the CDN manager 108 is shown installed on the server 102, in some embodiments, the CDN manager 108 can be installed on separate server or other system that is communication with the server 102. As such, the illustrated embodiment should not be construed as being limiting. The server 102 also includes a server storage 110 that can be implemented via any known storage technology to store data 112 such as web pages, image files, video files, audio files, other files, and/or other data. For purposes of explanation, the data 112 will be referred to herein as a web page and all the components thereof, including HTML code, JAVA code, JAVASCRIPT code, cascading style sheet ("CSS"), any combination thereof, and the like.

The CDN manager 108 can divide the data 112 into a plurality of data parts 114A-114N (referred to herein collectively as "data parts 114" or individually as "data part 114") and can distribute the data parts 114 among the CDNs 104. In the illustrated example, the server 102 divides the data 112 into N parts: a first data part ("data part$_1$ 114A") that is sent to a first CDN ("CDN$_1$") 104A; a second data part ("data part$_2$ 114B") that is sent to a second CDN ("CDN$_2$") 104B; and an N$^{th}$ data part ("data part$_N$ 114N") that is sent to an N$^{th}$ CDN ("CDN$_N$") 104N. It should be understood that the CDN manager 108 may divide the data 112 into any number of data parts 114 depending on the needs of a given implementation and the number of CDNs 104 available to host the data parts 114. The CDN manager 108 may divide the data 112 based upon a rule set established by or for the owner and/or the operator of the server 102 and/or the owner of the data 112. The CDN manager 108 may divide the data 112 based upon different rule sets depending on the type of the data 112. For example, a web page may have one rule set, while individual image files may have a different rule set. Alternatively, the CDN manager 108 may divide the data 112 in some arbitrary manner and not based on any specific rule(s) so as not to be potentially predictable.

In the illustrated example, the CDNs 104 are shown operating in communication with the PDN 106 without specificity regarding where the CDNs 104 are deployed geographically. In real-world implementations, the CDNs 104 are likely deployed to serve a certain geographical area. A similar cluster of CDNs 104 may be deployed in another geographical area. As such, depending on the circumstances of a given implementation, the server 102 (or a functionally equivalent server located elsewhere) may distribute the data parts 114 to the CDNs 104 clustered in different geographical areas, such as, for example, CDN clusters in the North, South, East, West, or subareas thereof (i.e., Northeast, Southeast, etc.). For illustrative purposes, however, the server 102 will be described as distributing the data parts 114 to the CDNs 104A-104N under the presumption that these CDNs 104 serve a certain geographical area (e.g., Southeast).

The CDN manager 108 can distribute the data parts 114 to the CDNs 104 based upon one or more rules. A rule may specify, for example, that the data part(s) 114 to be downloaded first should be cached at the CDN 104 that is closest to the majority of end user devices 116A-116N (referred to herein collectively as "user devices 116" or individually as "user device 116"), such as smartphones, laptops or other traditional computers, tablets, video game systems, Internet of Things ("IoT") devices, and/or other computing devices, that can execute applications 122A-122N (referred to herein collectively as "applications 122" or individually as "application 122"). Another rule may specify, for example, that the data part(s) 114 requiring a longer processing time, such as might be the case with high resolution image files, are cached at the CDN 104 that is closest to the majority of user devices 116. Other rules are contemplated and may be defined as needed for a given implementation. As such, the foregoing examples should not be construed as being limiting in any way.

The CDN manager 108 can inform the CDNs 104 of a location 118 and a sequence 120 of the data parts 114 so that if the user device 116 requests a web page from the nearest CDN 104, such as the $N^{th}$ CDN 104N in the illustrated example, the $N^{th}$ CDN 104 knows from which CDN(s) 104 and in which order to collect the remaining data part(s) 114 that can be combined to form the web page. In some embodiments, a specific sequence is required. In other embodiments, the data parts 114 can be collected in any order. After the CDN 104 collects all of the data parts 114 for the requested web page, the CDN 104 can send the combined data parts 114 as the requested web page (i.e., the data 112) to the user device 116 for execution via the application 122 such as a web browser.

The foregoing security mechanism will make it difficult for attackers to poison CDN caches because the whole web page is not available for an extended period of time as one piece of data in one CDN 104. The attacker would need to compromise all CDNs 104 that contain parts of the web page and maliciously manipulate these CDNs 104. This is more difficult than manipulating the current architecture where a web page is cached on one CDN 104 that can be targeted for cache poisoning, and thus it is unlikely that an attacker would be compelled to attack CDNs that incorporate this security solution.

Figure 1B:
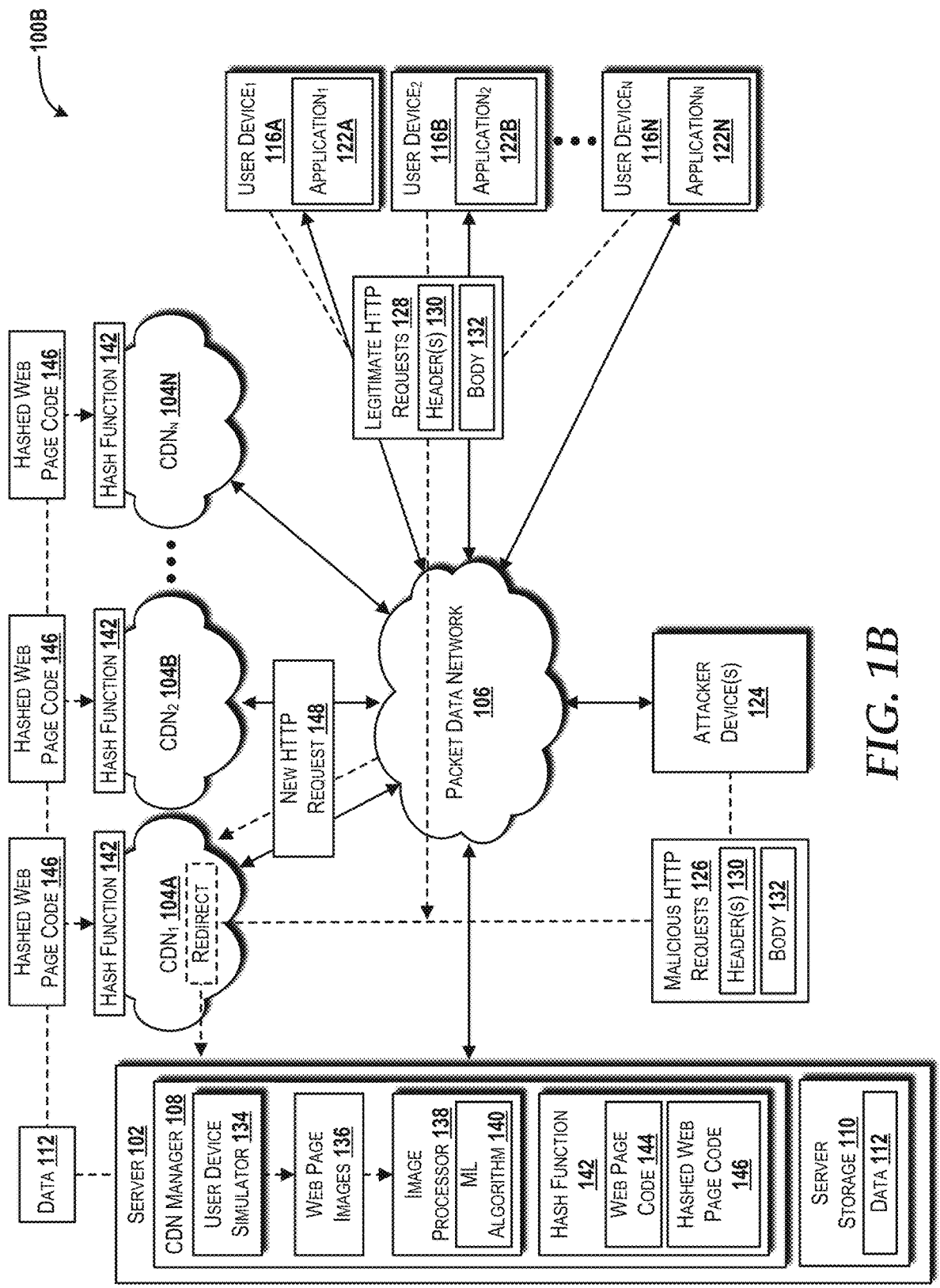
FIG. 1B is a block diagram illustrating an illustrative operating environment in which a security mechanism to mitigate or prevent dynamic content attacks can be implemented in accordance with various embodiments of the concepts and technologies disclosed herein.

Turning now to FIG. 1B, an illustrative operating environment 100B in which a security mechanism to mitigate or prevent dynamic content attacks can be implemented will be described. It should be understood that the operating environment 100B and the various components thereof have been greatly simplified for purposes of discussion. Accordingly, additional or alternative components of the operating environment 100B can be made available without departing from the embodiments described herein.

The illustrated operating environment 100B includes the server 102, the CDNs 104, the PDN 106, the CDN manager 108, the server storage 110, the data 112, the user devices 116, and the applications 122 illustrated and described above with reference to FIG. 1A. In the operating environment 100B, the CDN manager 108 is configured to protect against dynamic content attacks (also referred to as "dynamic HTTP flood attacks") by one or more attacker devices 124. During a dynamic content attack, one or more of the attacker devices 124 can generate multiple malicious HTTP requests 126 for dynamic content. Since dynamic content is not stored on the CDNs 104, the CDNs 104 will redirect all of the malicious HTTP requests 126 to the origin server, which, in the illustrated example, is the server 102. In many cases, the origin server 102 does not have the capacity to handle all of the malicious HTTP requests 126, which results in a failure to process legitimate HTTP requests 128 from legitimate users (such as those associated with the user devices 116), and thereby creates a DoS scenario.

The malicious HTTP requests 126 can include any HTTP methods, although GET and POST methods are most commonly used in dynamic content attacks. The malicious HTTP requests 126 can include one or more headers 130 and a body 132. GET methods typically do not use the body 132, but POST methods can include any information the attacker device(s) 124 wants to send to the server 102. The malicious HTTP requests 126 can include a cache-control header as one of the headers 130. By using the cache-control header, the attacker devices 124 can force the CDNs 104 to redirect the malicious HTTP requests 126 to the server 102. In addition, the malicious HTTP requests 126 can request the same web page multiple times in an effort to avoid detection by the server 102. Attackers can change some aspects of the malicious HTTP requests 126 that are mostly irrelevant to the actual requests to fool the server 102 into determining that the malicious HTTP requests 126 are for different web pages, when in fact the malicious HTTP requests 126 are for the same web page that the attackers are targeting for a DoS attack. The CDN manager 108 can analyze the malicious HTTP requests 126 to determine if the malicious HTTP requests 126 are for the same web page or different web pages. By determining whether the malicious HTTP requests 126 are for the same web page or different web pages, the CDN manager 108 can prevent DoS attacks.

The CDN manager 108 can receive HTTP requests, including the malicious HTTP requests 126 and the legitimate HTTP requests 128, and can parse the header(s) 130 to determine the URLs of the requested content (e.g., a specific web page). The CDN manager 108 can then execute a user device simulator 134 to simulate the role of one of the user devices 116 to access the URLs identified in the HTTP requests. In some embodiments, the user device simulator 134 is or includes a web browser or a web browser emulator. In addition, the user device simulator 134 may simulate or emulate the hardware and/or other software (e.g., operating system) of the user device 116. The user device simulator 134 can generate a human-readable/viewable web page image 136 for each HTTP request, including the malicious HTTP requests 126 (currently unknown to the server 102 as malicious) and the legitimate HTTP requests 128 (currently unknown to the server 102 as legitimate). The resulting web page images 136 can be fed to an image processor 138. The image processor 138 can execute a machine learning algorithm 140 to analyze the web page images 136 to determine if the web pages requested in the malicious HTTP requests 126 and the legitimate HTTP requests 128 are the same or not. In some embodiments, the machine learning algorithm 140 can be or can include a convolution neural network algorithm or similar commercially available machine learning algorithm that can be used for processing images. If the image processor 138 determines that the web page images 136 are not the same, the CDN manager 108 can conclude that the requests are legitimate HTTP requests 128 and the CDN manager 108 can forward the requested web page(s) (shown as "data 112") to one or more of the CDNs 104. If, however, the image processor 138 determines that the web page images 136 are the same, the CDN manager 108 can conclude that the HTTP requests are malicious HTTP requests 126. A web page code 144 associated with the web page images 136 that are determined to be the same can be fed into a hash function 142 to create a hashed web page code 146. The hash function 142 can be any cryptographic hash function, although the secure hash algorithms ("SHA") family of cryptographic hash functions published by the National Institute of Standards and Technology ("NIST") are some options contemplated for real-world implementations of the hash function 142. The hashed web page code 146 can be stored and used for future comparisons by the server 102 and/or the CDNs 104. The hashed web page code 146 can also be distributed to the CDNs 104. In some embodiments, the CDN manager 108 can distribute the hashed web page code 146 to the CDNs 104 using a distributed ledger (not shown). The CDN manager 108 can provide the hash function 142 to the CDNs 104.

When the CDNs 104 receive a new HTTP request 148 for a specific web page previously processed by the CDN manager 108, the CDNs 104 can run the requested web page code through the hash function 142 received from the CDN manager 108. The CDNs 104 can compare the new hash code generated by the hash function 142 to the hashed web page code 146. If the two hash codes are the same, then the specific web page is determined to be legitimate (i.e., not maliciously manipulated). Otherwise, the specific web page is determined to be maliciously manipulated and the CDNs 104 can deny the new HTTP request 148.

Figure 1C:
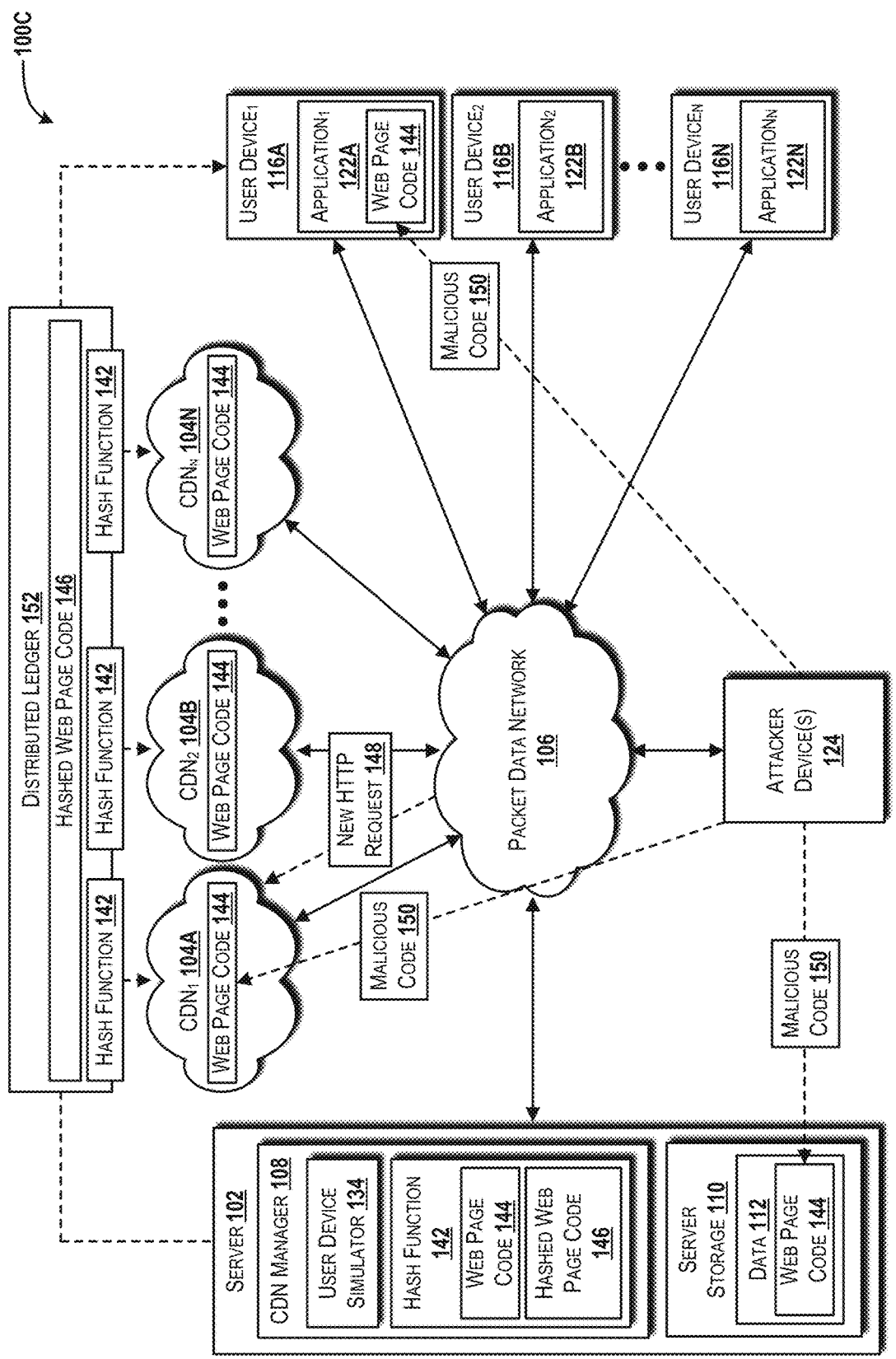
FIG. 1C is a block diagram illustrating an illustrative operating environment in which a security mechanism to detect illegal insertion of tracking pixels or other malicious code into web pages can be implemented in accordance with various embodiments of the concepts and technologies disclosed herein.

Turning now to FIG. 1C, an illustrative operating environment 100C in which a security mechanism detects illegal insertion of tracking pixels or other malicious code 150 can be implemented will be described. It should be understood that the operating environment 100C and the various components thereof have been greatly simplified for purposes of discussion. Accordingly, additional or alternative components of the operating environment 100C can be made available without departing from the embodiments described herein.

Many websites utilize specialized HTML code called a tracking pixel (also referred to as a 1×1 pixel or pixel tag) to acquire and analyze data about users without being easily detected (primarily due to the small size of a single pixel). Typically, this information is used by companies to perform website analytics and targeted advertising. Attackers can exploit tracking pixels by illegal insertion into web pages. Since the tracking pixel is difficult if not impossible for a user to detect with the naked eye, users may access web pages infected by illegal tracking pixels without suspicion, and the attacker can obtain data about the user device 116, the application 122 (and other applications), and the IP address used to access an infected web page. Attackers may be able to glean additional information from the tracking pixel.

The illustrated operating environment 100C includes the server 102, the CDNs 104, the PDN 106, the CDN manager 108, the server storage 110, the data 112, the user devices 116, and the applications 122 illustrated and described above with reference to FIGS. 1A and 1B. In the operating environment 100C, the CDN manager 108 is configured to detect the illegal insertion of the malicious code 150 (e.g., an illegal tracking pixel or similar malicious code), by one or more of the attacker devices 124, into the web page code 144 of one or more web pages. The attacker device(s) 124 may insert the malicious code 150 directly onto the server 102 via an HTTP PUT or similar method. The attacker device(s) 124 alternatively or additionally may target the web page code 144 stored on one or more of the CDNs 104. The web page code 144 to be executed by the application 122 (e.g., a web browser) operating on the user device 116 may also be vulnerable to insertion of the malicious code 150 by the attacker device(s) 124.

The CDN manager 108 can be used to detect illegal insertion of the malicious code 150. In particular, the CDN manager 108 can hash the HTML and other code (shown as "web page code 144") of each website to be served by the server 102. The web page code 144 may be a single web page which may itself be a website or part of a larger website that contains multiple web pages. For ease of explanation, the web page code 144 will be described as the HTML code of a single web page. This should not be construed as being limiting in any way. The CDN manager 108 can hash the web page code 144 using the hash function 142 to create the hashed web page code 146. The CDN manager 108 can distribute the hashed web page code 146 to the CDNs 104 via a distributed ledger 152.

The CDN 104 can receive a new HTTP request 148 from one or more of the user devices 116. Before a CDN 104 responds to the new HTTP request 148, the CDN 104 can hash the web page code 144 of the web page identified in the new HTTP request 148 and can compare the results to the hashed web page code 146 stored in the distributed ledger 152. If the hash codes match, the CDN 104 can respond to the new HTTP request 148 with the web page code 144. If, however, the hash codes do not match, the CDN 104 can deny the new HTTP request 148 and may notify the server 102 of a potential attack that uses the malicious code 150.

In some embodiments, the distributed ledger 152 also can be dispatched to the user device 116 when the user device 116 attempts to access the web page code 144. The user device 116 can perform periodic or random checks to ensure the hash values of the web pages being visited match the value contained in the distributed ledger 152. In some embodiments, before a web page is sent from a CDN 104 or the server 102, the CDN manager 108 can utilize the user device simulator 134 to simulate or emulate the user device 116 so as to execute the web page code 144, and emulate user interaction with the corresponding web page (e.g., a user clicking on a particular element). For example, the user clicking on a particular element may trigger hidden processes and/or try to reach a foreign server such as might be the case if the malicious code 150 has been illegally inserted into the web page code 144. This implementation in static web pages does not require extensive processing; however, for dynamic web content, this implementation can be performed either at the server side or the client side based on where the dynamic content is parsed.

Figure 2:
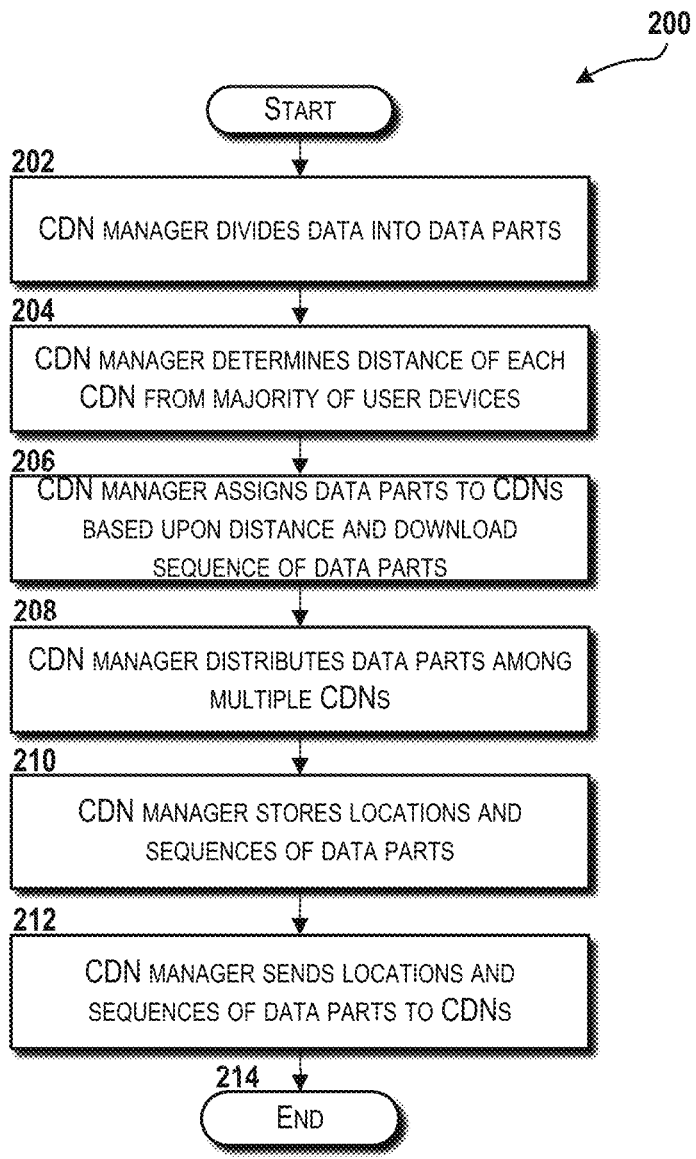
FIG. 2 is a flow diagram illustrating a method performed by a CDN manager for implementing a security mechanism to mitigate or prevent CDN cache poisoning, according to an illustrative embodiment.

Turning now to FIG. 2, a method 200 performed by the CDN manager 108 for implementing a security mechanism to mitigate or prevent CDN cache poisoning will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

For purposes of illustrating and describing some of the concepts of the present disclosure, the method will be described as being performed, at least in part, by the server 102, the CDN manager 108, the CDN 104 or components thereof (e.g., cache servers), and/or the user device 116. It should be understood that additional and/or alternative devices can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the CDN manager 108 divides the data 112 into the data parts 114. The CDN manager 108 may divide the data 112 based upon a rule set established by or for the owner and/or the operator of the server 102 and/or the owner of the data 112. The CDN manager 108 may divide the data 112 based upon different rule sets depending on the type of the data 112. For example, a web page may have one rule set, while individual image files may have a different rule set. Alternatively, the CDN manager 108 may divide the data 112 in some arbitrary manner and not based on any specific rule(s) so as not to be potentially predictable.

From operation 202, the method 200 proceeds to operation 204. At operation 204, the CDN manager 108 determines the distance of each CDN 104 from a majority of the user devices 116. In some embodiments, the CDN manager 108 can determine the distance based upon historical information about the collective locations of the user devices 116 or prediction of the distance based on behavioral and/or anticipated factors by machine learning and/or artificial intelligence models. Such information may be derived from IP addresses (although these might not be accurate in some instances) and/or from location data obtained from a cellular network and/or other communications network to which the user devices 116 are connected. The CDN 104 that is the shortest distance from the majority of the user devices 116 can be identified as the destination for the data part(s) 114 that is/are to be downloaded first.

From operation 204, the method 200 proceeds to operation 206. At operation 206, the CDN manager 108 assigns the data parts 114 to the CDNs 104 based upon the distances determined at operation 204. For example, the data part 114 to be downloaded first can be assigned to the CDN 104 that is closest in distance to the majority of the user devices 116. In some embodiments, the CDN manager 108 can also consider the sequence 120 in consideration of which data part 114 is to be downloaded first, second, third, and so on. From operation 206, the method 200 proceeds to operation 208. At operation 208, the CDN manager 108 distributes the data parts 114 among multiple CDNs 104.

From operation 208, the method 200 proceeds to operation 210. At operation 210, the CDN manager 108 stores the locations 118 and the sequence 120 of the data parts 114. From operation 210, the method 200 proceeds to operation 212. At operation 212, the CDN manager 108 sends the locations 118 and the sequence 120 to the CDNs 104, which can store this information to be used to collect the data parts 114 that can be recombined to form the data 112.

From operation 212, the method 200 proceeds to operation 214. The method 200 can end at operation 214.

Figure 3:
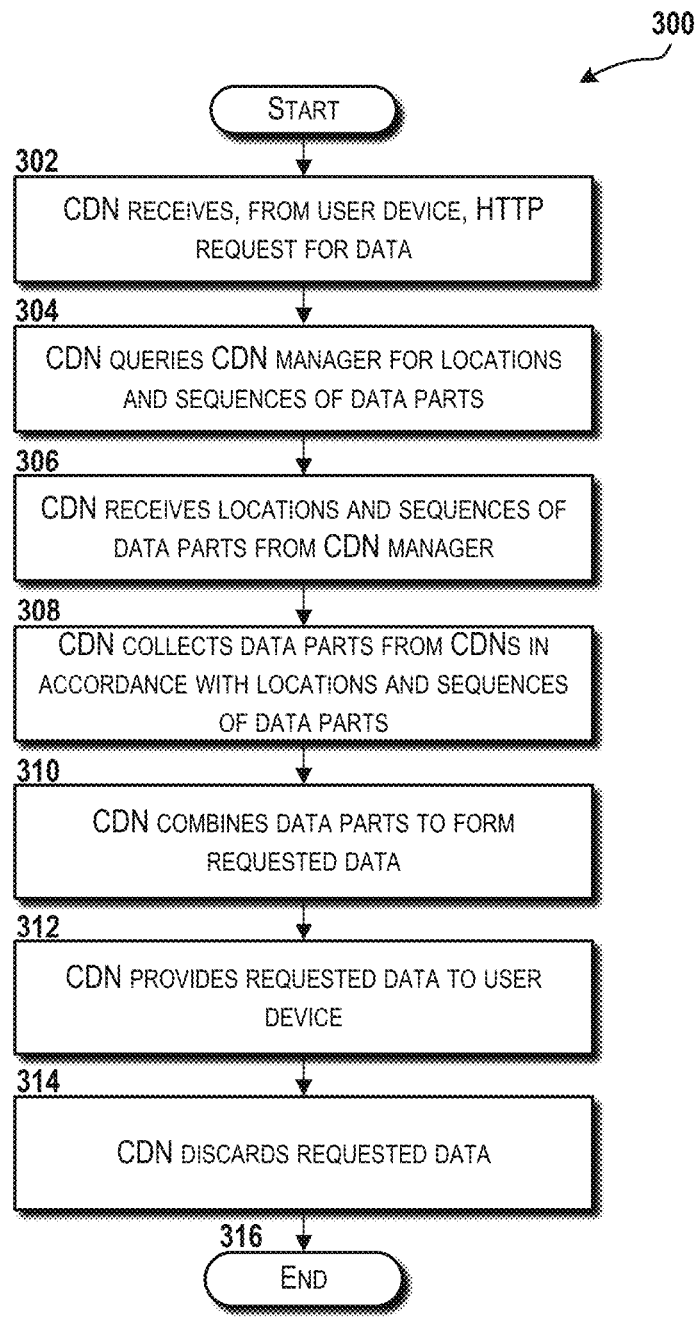
FIG. 3 is a flow diagram illustrating a method performed by a CDN for implementing a security mechanism to mitigate or prevent CDN cache poisoning, according to an illustrative embodiment.

Turning now to FIG. 3, a method 300 performed by the CDN 104 for implementing a security mechanism to mitigate or prevent CDN cache poisoning will be described, according to an illustrative embodiment. The method 300 begins and proceeds to operation 302. At operation 302, the CDN 104 receives, from the user device 116, an HTTP request for the data 112, such as a particular web page.

From operation 302, the method 300 proceeds to operation 304. At operation 304, the CDN 104 queries the CDN manager 108 for the locations 118 and the sequence 120 of the data parts 114 associated with the data 112 identified in the HTTP request. In some embodiments, the CDN manager 108 can inform the CDNs 104 of the locations 118 and the sequence 120 ahead of time, such as described above in FIG. 2 with reference to operation 212 in the method 200. This operation can also be performed in response to the query at operation 304 of the present method.

From operation 304, the method 300 proceeds to operation 306. At operation 306, the CDN receives the locations 118 and the sequences 120 of the data parts 114 associated with the data 112 identified in the HTTP request. From operation 306, the method 300 proceeds to operation 308. At operation 308, the CDN 104 collects the data parts 114 from the other CDN(s) 104 in accordance with the locations 118 and the sequences 120 of the data parts 114. From operation 308, the method 300 proceeds to operation 310. At operation 310, the CDN 104 combines the data parts 114 to form the requested data 112. From operation 310, the method 300 proceeds to operation 312. At operation 312, the CDN 104 provides the requested data 112 to the user device 116.

From operation 312, the method 300 proceeds to operation 314. At operation 314, the CDN 104 discards the data 112 saving only the data part 114 previously stored by the CDN 104 prior to receiving the request at operation 302. From operation 314, the method 300 proceeds to operation 316. The method 300 can end at operation 316.

Figure 4:
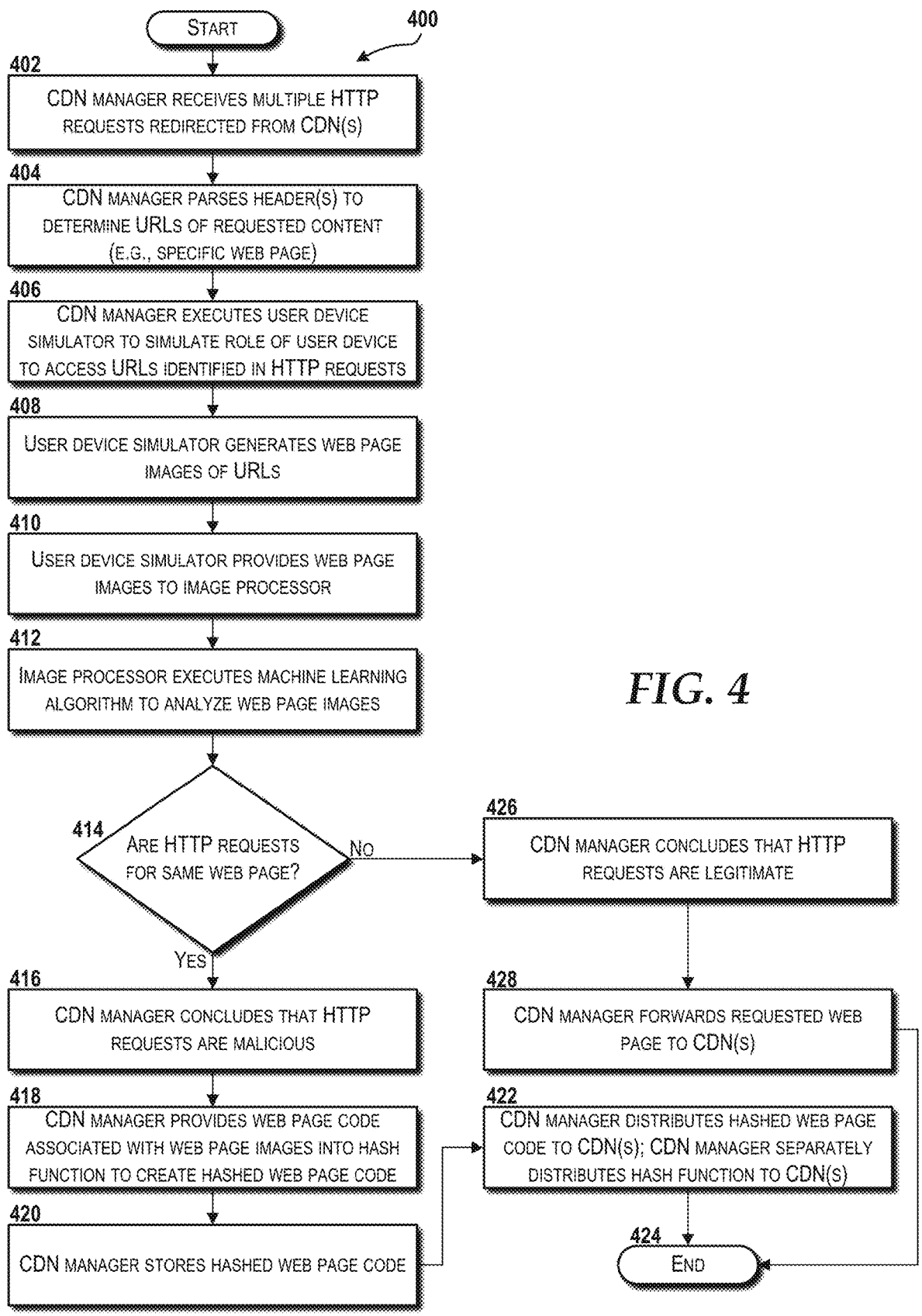
FIG. 4 is a flow diagram illustrating a method performed by a CDN manager for implementing a security mechanism to mitigate or prevent dynamic content attacks, according to an illustrative embodiment.

Turning now to FIG. 4, a method 400 performed by the CDN manager 108 for implementing a security mechanism to mitigate or prevent dynamic content attacks will be described, according to an illustrative embodiment. The method 400 begins and proceeds to operation 402. At operation 402, the CDN manager 108 receives multiple HTTP requests that have been redirected from one or more of the CDNs 104. The HTTP requests can include both malicious HTTP requests and legitimate HTTP requests. At this point, neither the CDNs 104 nor the CDN manager 108 knows whether the HTTP requests are malicious or legitimate.

From operation 402, the method 400 proceeds to operation 404. At operation 404, the CDN manager 108 parses the headers 130 of the HTTP requests to determine the URLs of the requested content. For purposes of explanation, and not limitation, the requested content will be referred to as a specific web page. In real-world implementations, the requested content can be any content associated with a URL, including audio, video, images, applications, or the like.

From operation 404, the method 400 proceeds to operation 406. At operation 406, the CDN manager 108 executes the user device simulator 134 to simulate the role of the user device 116 to access the URLs identified in the HTTP requests. From operation 406, the method 400 proceeds to operation 408. At operation 408, the user device simulator 134 generates the web page images 136 of the URLs. In some embodiments, the user device simulator 134 can execute a web browser application or emulation thereof, such as similar to the application 122 executed by the user device 116. From operation 408, the method 400 proceeds to operation 410. At operation 410, the user device simulator 134 provides the web page images 136 to the image processor 138.

From operation 410, the method 400 proceeds to operation 412. At operation 412, the image processor 138 executes the machine learning algorithm 140 to analyze the web page images 136. From operation 412, the method 400 proceeds to operation 414. At operation 414, the CDN manager 108 determines if the HTTP requests are for the same web page based upon the results of the analysis performed by the image processor 138 at operation 412. If the CDN manager 108 determines that the HTTP requests are for the same web page, the method 400 proceeds from operation 414 to operation 416. At operation 416, the CDN manager 108 concludes that the HTTP requests are malicious (i.e., the malicious HTTP requests 126). From operation 416, the method 400 proceeds to operation 418. At operation 418, the CDN manager 108 provides the web page code 144 associated with the web page images 136 into the hash function 142 to create the hashed web page code 146. From operation 418, the method 400 proceeds to operation 420. At operation 420, the CDN manager 108 stores the hashed web page code 146. From operation 420, the method 400 proceeds to operation 422. At operation 422, the CDN manager 108 distributes the hashed web page code 146 to the CDN(s) 104. Also at operation 422, the CDN manager 108 separately distributes the hash function 142 to the CDN(s) 104. The CDN manager 108 may distribute the hash function 142 to the CDN(s) 104 before distributing the hashed web page code 146 to the CDN(s) 104. From operation 422, the method proceeds to operation 424. The method 400 can end at operation 424.

Returning to operation 414, if the CDN manager 108 determines that the HTTP requests are not for the same web page, the method 400 proceeds from operation 414 to operation 426. At operation 426, the CDN manager 108 concludes that the HTTP requests are legitimate (i.e., the legitimate HTTP requests 128). From operation 426, the method 400 proceeds to operation 428. At operation 428, the CDN manager 108 forwards the requested web page (as the data 112) to the CDN(s) 104. From operation 428, the method 400 proceeds to operation 424. The method 400 can end at operation 424.

Figure 5:
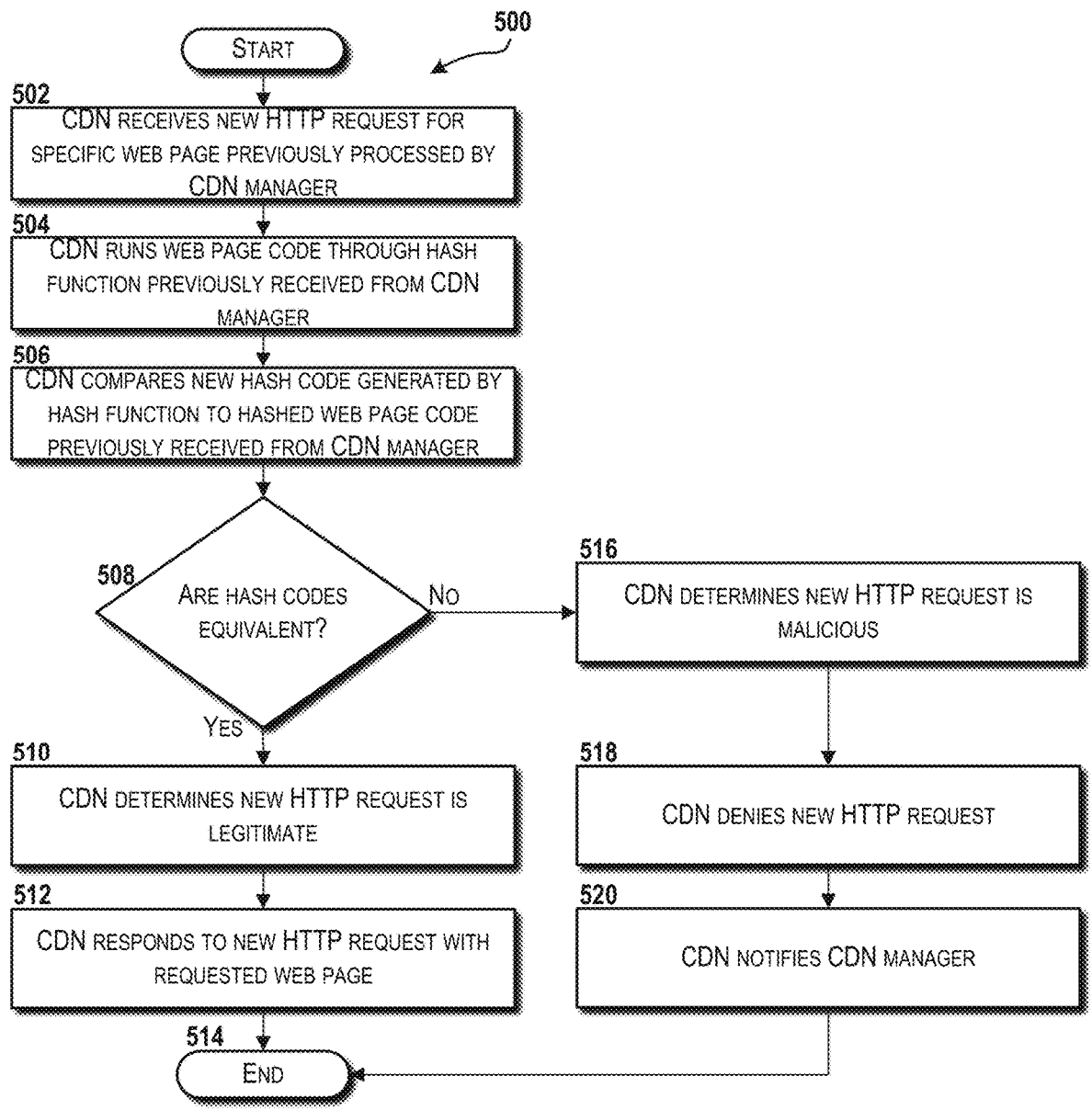
FIG. 5 is a flow diagram illustrating a method performed by a CDN for implementing a security mechanism to mitigate or prevent dynamic content attacks, according to an illustrative embodiment.

Turning now to FIG. 5 is a flow diagram illustrating a method 500 performed by one of the CDNs 104 for implementing a security mechanism to mitigate or prevent dynamic content attacks will be described, according to an illustrative embodiment. The method 500 begins and proceeds to operation 502. At operation 502, the CDN 104 receives the new HTTP request 148 for a specific web page that was previously processed by the CDN manager 108. From operation 502, the method 500 proceeds to operation 504. At operation 504, the CDN 104 runs the web page code 144 through the hash function 142 previously received from the CDN manager 108.

From operation 504, the method 500 proceeds to operation 506. At operation 506, the CDN 104 compares the new hash code generated by the hash function 142 to the hashed web page code 146 previously received from the CDN manager 108. From operation 506, the method 500 proceeds to operation 508. At operation 508, the CDN 104 determines if the hash codes are equivalent. If the CDN 104 determines that the hash codes are equivalent, the method 500 proceeds to operation 510. At operation 510, the CDN 104 determines that the new HTTP request 148 is legitimate. From operation 510, the method 500 proceeds to operation 512. At operation 512, the CDN 104 responds to the new HTTP request 148 with the requested web page. From operation 512, the method 500 proceeds to operation 514. At operation 514, the method 500 can end.

Returning to operation 508, if the CDN 104 determines that the hash codes are not equivalent, the method 500 proceeds to operation 516. At operation 516, the CDN 104 determines that the new HTTP request 148 is malicious. From operation 516, the method 500 proceeds to operation 518. At operation 518, the CDN 104 denies the new HTTP request 148. From operation 518, the method 500 proceeds to operation 520. At operation 520, the CDN 104 notifies the CDN manager 108 that the new HTTP request 148 was denied for being malicious. From operation 520, the method 500 proceeds to operation 514. At operation 514, the method 500 can end.

Figure 6:
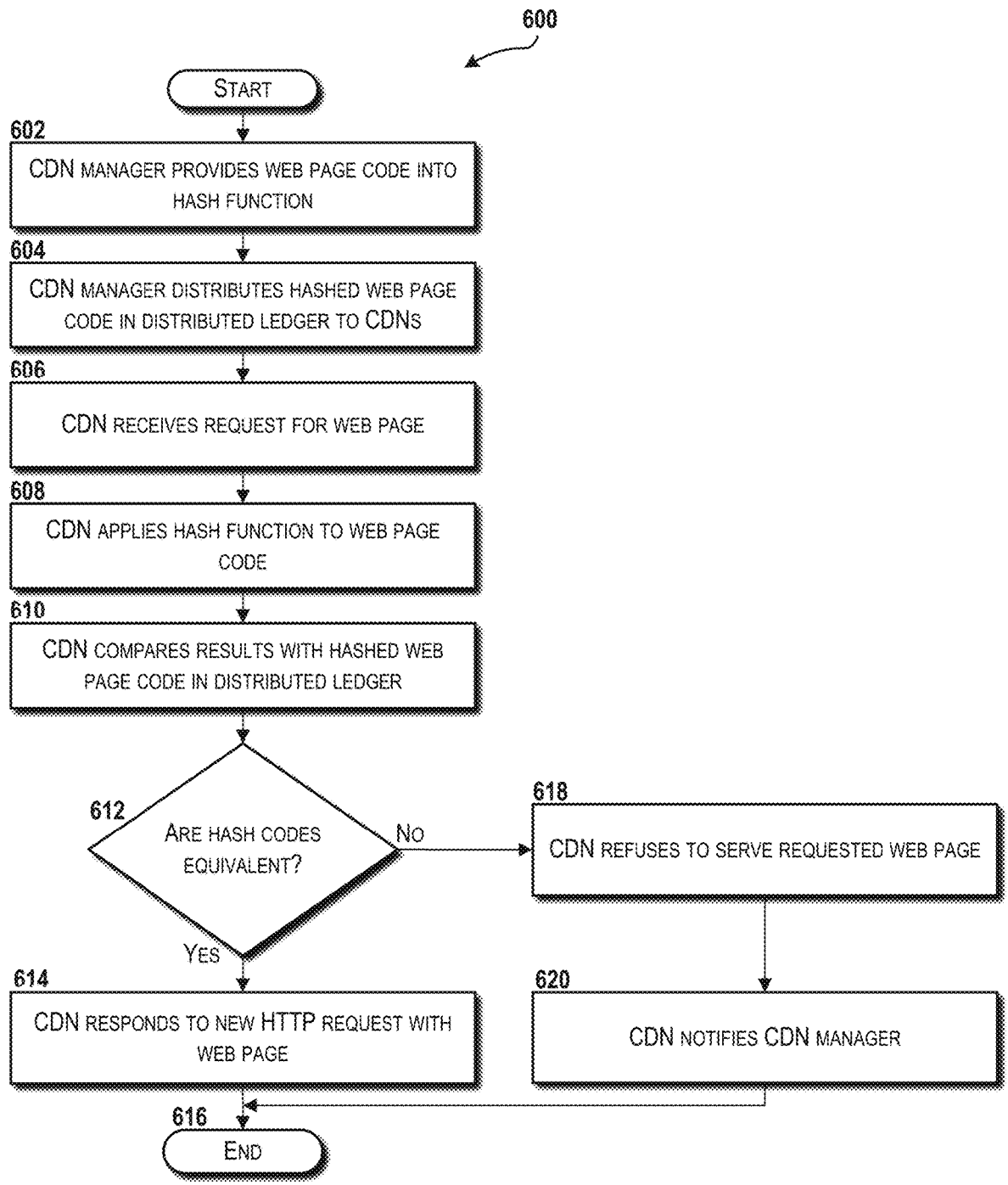
FIG. 6 is a flow diagram illustrating a method performed by a CDN manager to detect illegal insertion of tracking pixels or other malicious code into web pages, according to an illustrative embodiment.

Turning now to FIG. 6, a flow diagram illustrating a method 600 to detect illegal insertion of tracking pixels or other malicious code 150 into the web page code 144 will be described, according to an illustrative embodiment. The method 600 begins and proceeds to operation 602. At operation 602, the CDN manager 108 provides the web page code 144 into the hash function 142. From operation 602, the method 600 proceeds to operation 604. At operation 604, the CDN manager 108 distributes the hashed web page code in the distributed ledger to the CDNs 104.

From operation 604, the method 600 proceeds to operation 606. At operation 606, the CDN 104 receives a new HTTP request 148 for a web page associated with the web page code 144. From operation 606, the method 600 proceeds to operation 608. At operation 608, the CDN 104 applies the hash function 142 to the web page code 144. From operation 608, the method 600 proceeds to operation 610. At operation 610, the CDN 104 compares the results with the hashed web page code 146 in the distributed ledger 152. From operation 610, the method 600 proceeds to operation 612. At operation 612, the CDN 104 determines if the hash codes are equivalent. If, at operation 612, the CDN 104 determines that the hash codes are equivalent, the method 600 proceeds to operation 614. At operation 614, the CDN 104 responds to the new HTTP request 148 with the requested web page. From operation 614, the method 600 proceeds to operation 616. The method 600 can end at operation 616.

Returning to operation 612, if the CDN 104 determines that the hash codes are not equivalent, the method 600 proceeds to operation 618. The hash codes not being equivalent can be indicative of illegal insertion of the malicious code 150 after the web page code 144 was originally cached at the CDNs 104. At operation 618, the CDN 104 refuses to serve the requested web page and may return an error to be displayed on the requesting user device 116. From operation 618, the method 600 proceeds to operation 620. At operation 620, the CDN 104 notifies the CDN manager 108. From operation 620, the method 600 proceeds to operation 616. The method 600 can end at operation 616.

Figure 7:
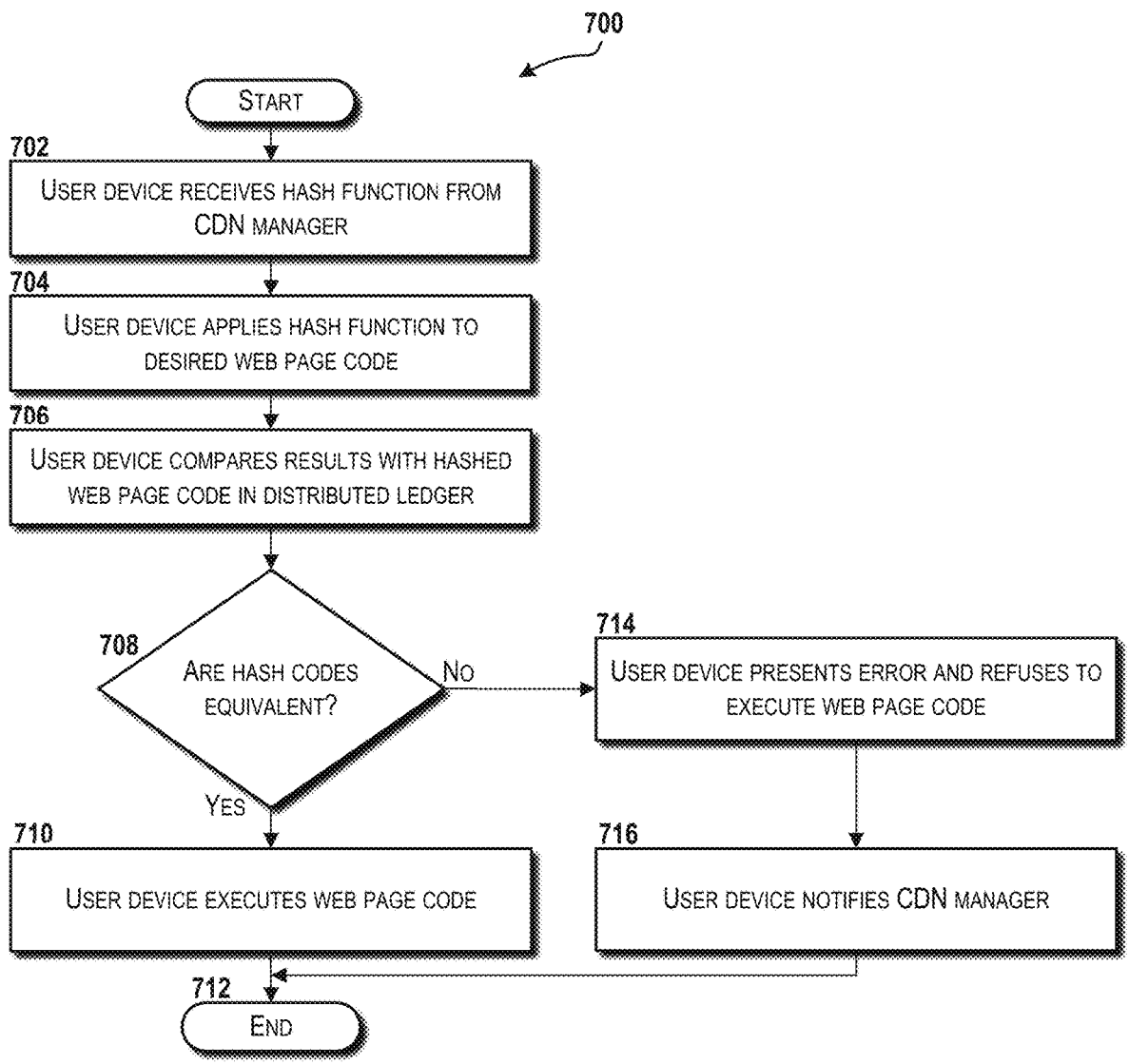
FIG. 7 is a flow diagram illustrating a method performed by a CDN to detect illegal insertion of tracking pixels or other malicious code into web pages, according to an illustrative embodiment.

Turning now to FIG. 7, a flow diagram illustrating another method 700 to detect insertion of tracking pixels or other malicious code 150 into web pages will be described, according to an illustrative embodiment. The method 700 begins and proceeds to operation 702. At operation 702, the user device 116 receives the hash function 142 from the CDN manager 108. From operation 702, the method 700 proceeds to operation 704. At operation 704, the user device 116 applies the hash function 142 to the desired web page code 144. For example, a user may enter a URL, click a URL link, or otherwise cause the application (embodied as a web browser) to execute the web page code 144, which, unbeknownst to the user device 116 or the user, may contain the malicious code 150 used by an attacker to track the activity of the user and the user device 116.

From operation 704, the method 700 proceeds to operation 706. At operation 706, the user device 116 compares the results from operation 704 to the hashed web page code 146 stored in the distributed ledger 152. From operation 706, the method proceeds to operation 708. At operation 708, the user device 116 determines if the hash codes are equivalent. If, at operation 708, the user device 116 determines that the hash codes are equivalent, the method 700 proceeds to operation 710. At operation 710, the user device 116 executes the web page code 144. From operation 710, the method 700 proceeds to operation 712. The method 700 can end at operation 712.

Returning to operation 708, if the user device 116 determines that the hash codes are not equivalent, the method 700 proceeds to operation 714. At operation 714, the user device 116 presents an error and refuses to execute the web page code 144. From operation 714, the method 700 proceeds to operation 716. At operation 716, the user device 116 notifies the CDN manager 108. From operation 716, the method 700 proceeds to operation 712. The method 700 can end at operation 712.

Figure 8:
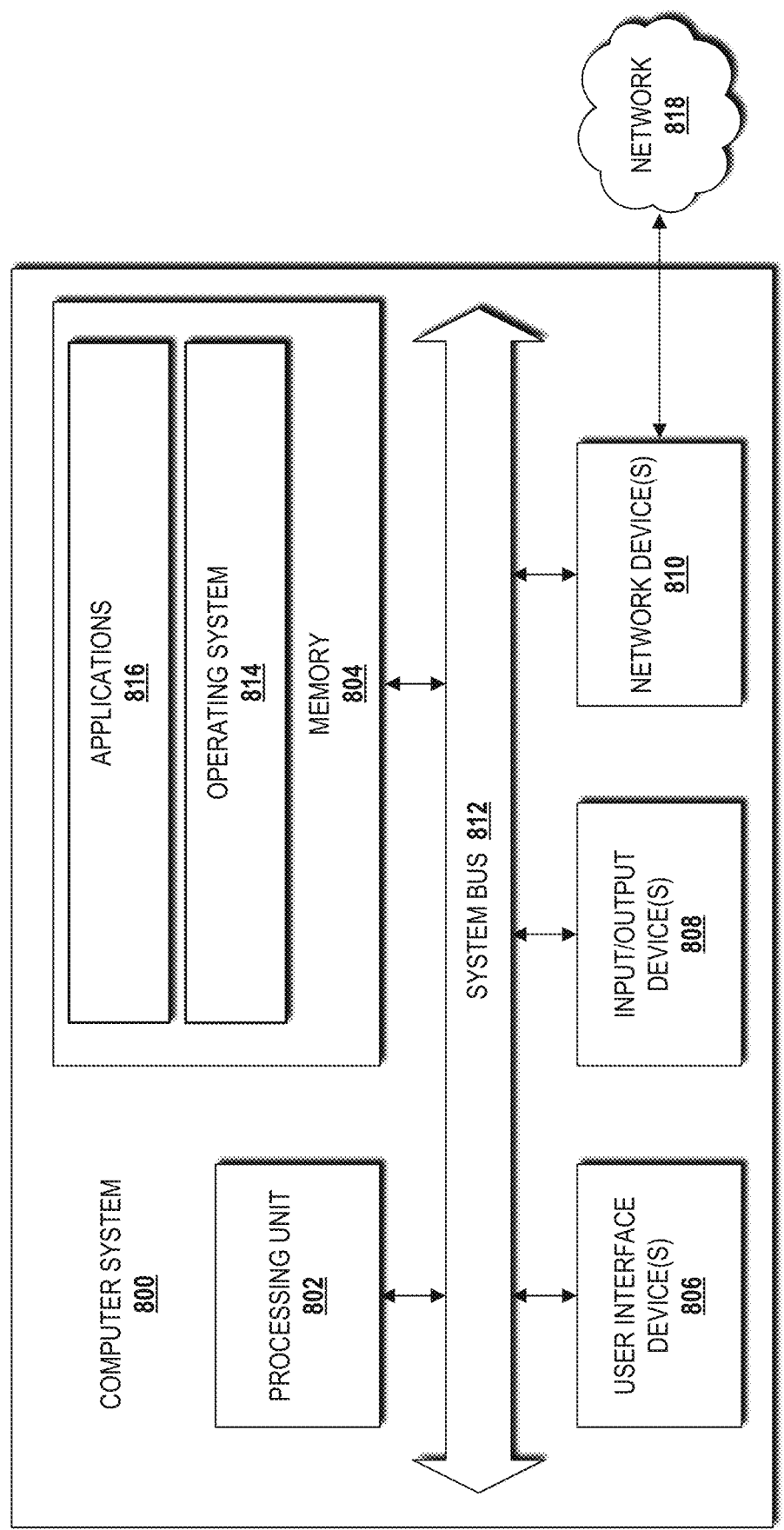
FIG. 8 is a block diagram illustrating an example computer system capable of implementing aspects of the embodiments presented herein.

Turning now to FIG. 8, a computer system 800 and components thereof will be described. An architecture similar to or the same as the computer system 800 can be used to implement various systems disclosed herein, such as the server 102, one or more systems utilized by the CDNs 104, one or more systems operating on or in communication with the PDN 106, the user devices 116, and/or other systems that can be used along with or in support of the concepts and technologies disclosed herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

The processing unit 802 might be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The illustrated memory 804 includes an operating system 814 and one or more applications 816. The operating system 814 can include, but is not limited to, members of the WINDOWS family of operating systems from MICROSOFT CORPORATION, the LINUX family of operating systems, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 806 may include one or more devices with which a user accesses the computer system 800. The user interface devices 806 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, a touchscreen, or an electronic stylus. Further, the I/O devices 808 may include one or more output devices, such as, but not limited to, a display screen or a printer. An I/O device 808 embodied as a display screen can be used to present information.

The network devices 810 enable the computer system 800 to communicate with a network 818, which can be or can include the CDN(s) 104, the PDN 106, other networks, and/or some combination thereof. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a WLAN such as a WI-FI network, a WWAN, a wireless PAN ("WPAN") such as BLUETOOTH, or a wireless MAN ("WMAN"). Alternatively, the network 818 may be a wired network such as, but not limited to, a WAN such as the Internet, a LAN such as the Ethernet, a wired PAN, or a wired MAN.

Figure 9:
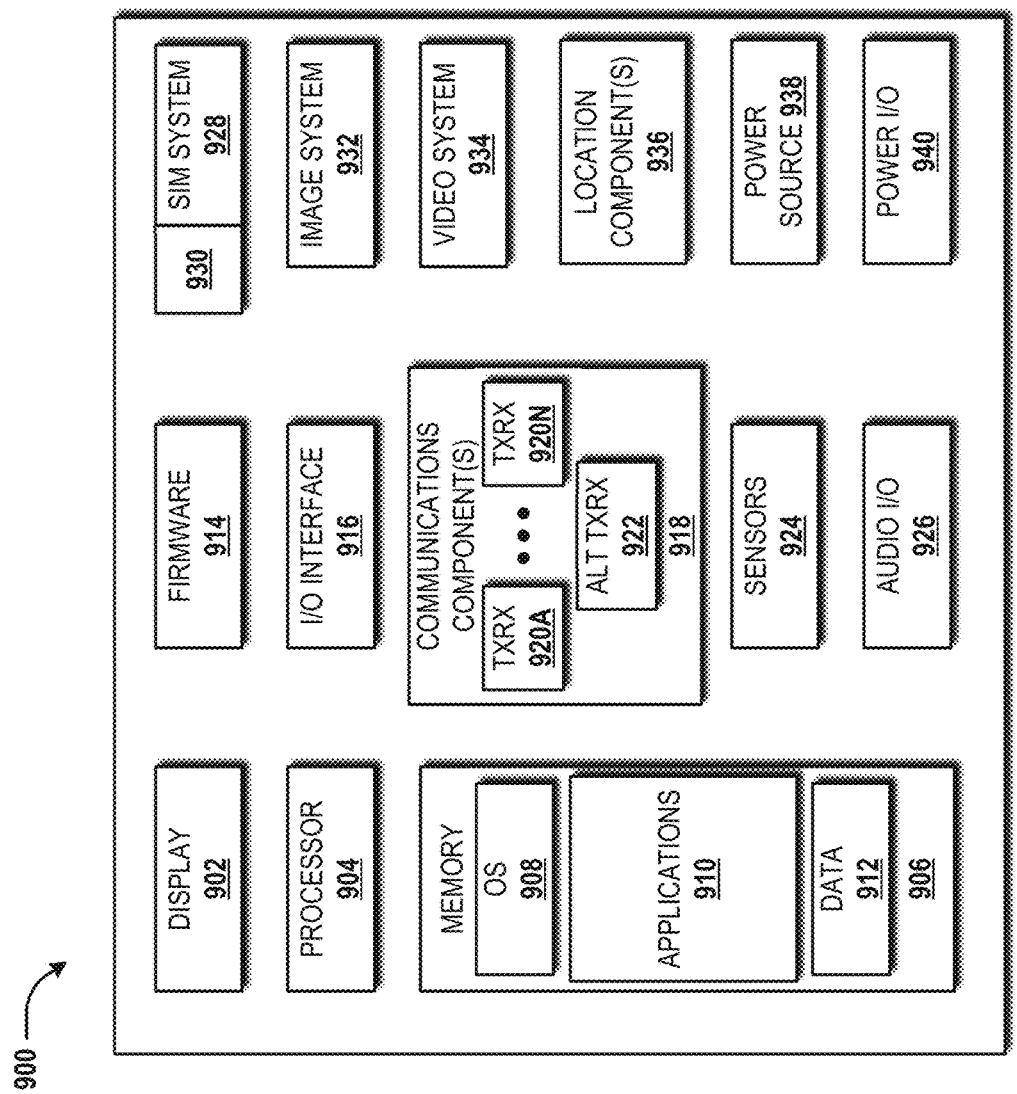
FIG. 9 is a block diagram illustrating an example mobile device capable of implementing aspects of the embodiments disclosed herein.

Turning now to FIG. 9, an illustrative mobile device 900 and components thereof will be described. In some embodiments, the user devices 116 are configured similar to or the same as the mobile device 900. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks, such as the packet data network 106, the Internet, or some combination thereof. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 918 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 800 described above with reference to FIG. 8. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the mobile device 900 may not include all of the components shown in FIG. 9, may include other components that are not explicitly shown in FIG. 9, or may utilize an architecture completely different than that shown in FIG. 9.

Figure 10:
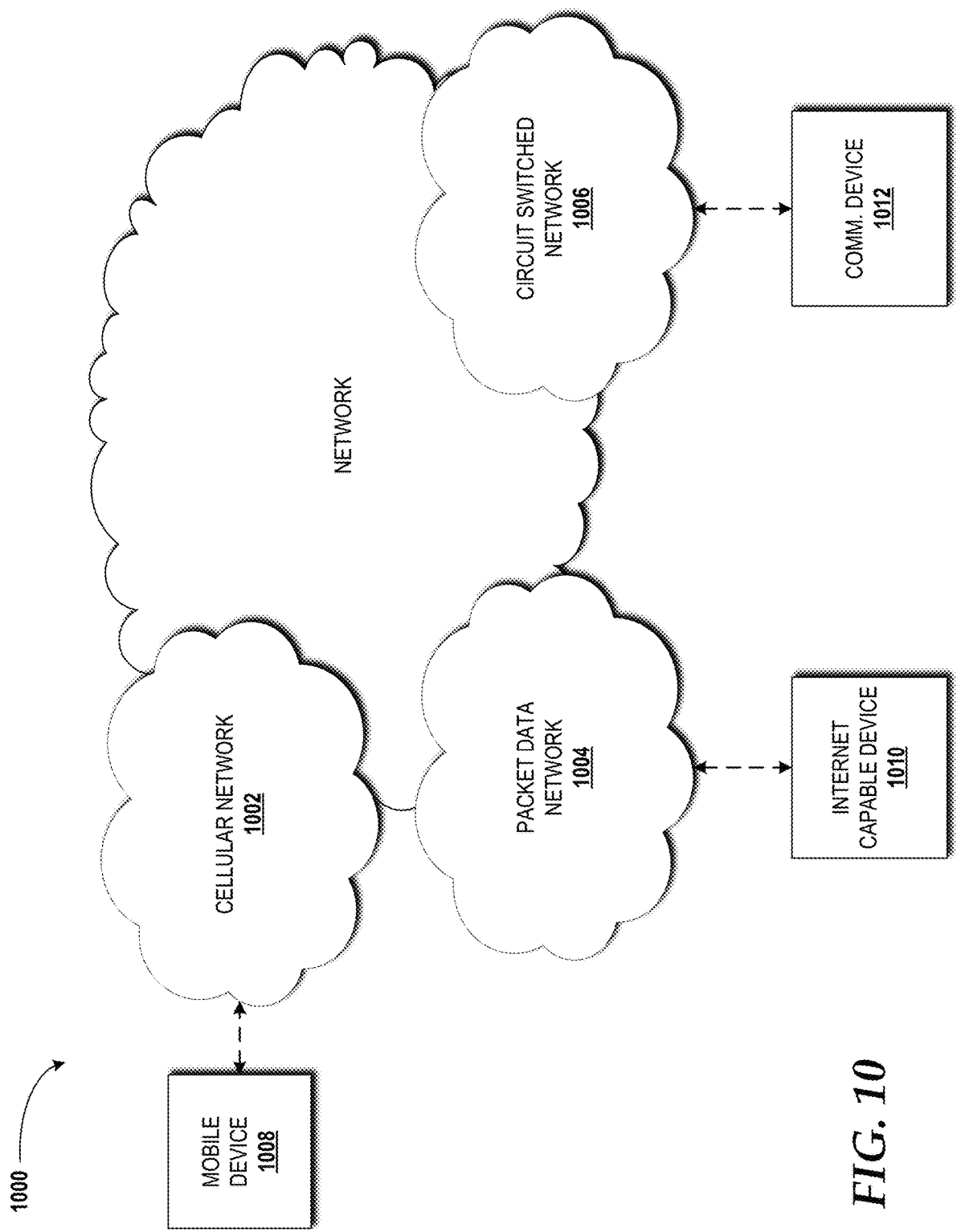
FIG. 10 is a diagram illustrating a network, according to an illustrative embodiment.

Turning now to FIG. 10, details of a network 1000 are illustrated, according to an illustrative embodiment. The network 1000 includes a cellular network 1002, a packet data network 1004 (e.g., the PDN 106 shown in FIGS. 1A-1C), and a circuit switched network 1006 (e.g., a public switched telephone network).

The cellular network 1002 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, and combinations thereof, can be operatively connected to the cellular network 1002. The mobile communications device 1008 can be configured similar to or the same as the mobile device 900 described above with reference to FIG. 9.

The cellular network 1002 can be configured as a GSM) network and can provide data communications via GPRS and/or EDGE. Additionally, or alternatively, the cellular network 1002 can be configured as a 3G Universal Mobile Telecommunications System ("UMTS") network and can provide data communications via the HSPA protocol family, for example, HSDPA, EUL, and HSPA+. The cellular network 1002 also is compatible with 4G mobile communications standards such as LTE, 5G mobile communications standards, or the like, as well as evolved and future mobile standards.

The packet data network 1004 includes various systems, devices, servers, computers, databases, and other devices in communication with one another, as is generally known. In some embodiments, the packet data network 1004 is or includes one or more WI-FI networks, each of which can include one or more WI-FI access points, routers, switches, and other WI-FI network components. The packet data network 1004 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1004 includes or is in communication with the Internet. The packet data network 1004 can be or can include one or more of the PDNs 112A-112N. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010 such as a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Figure 11:
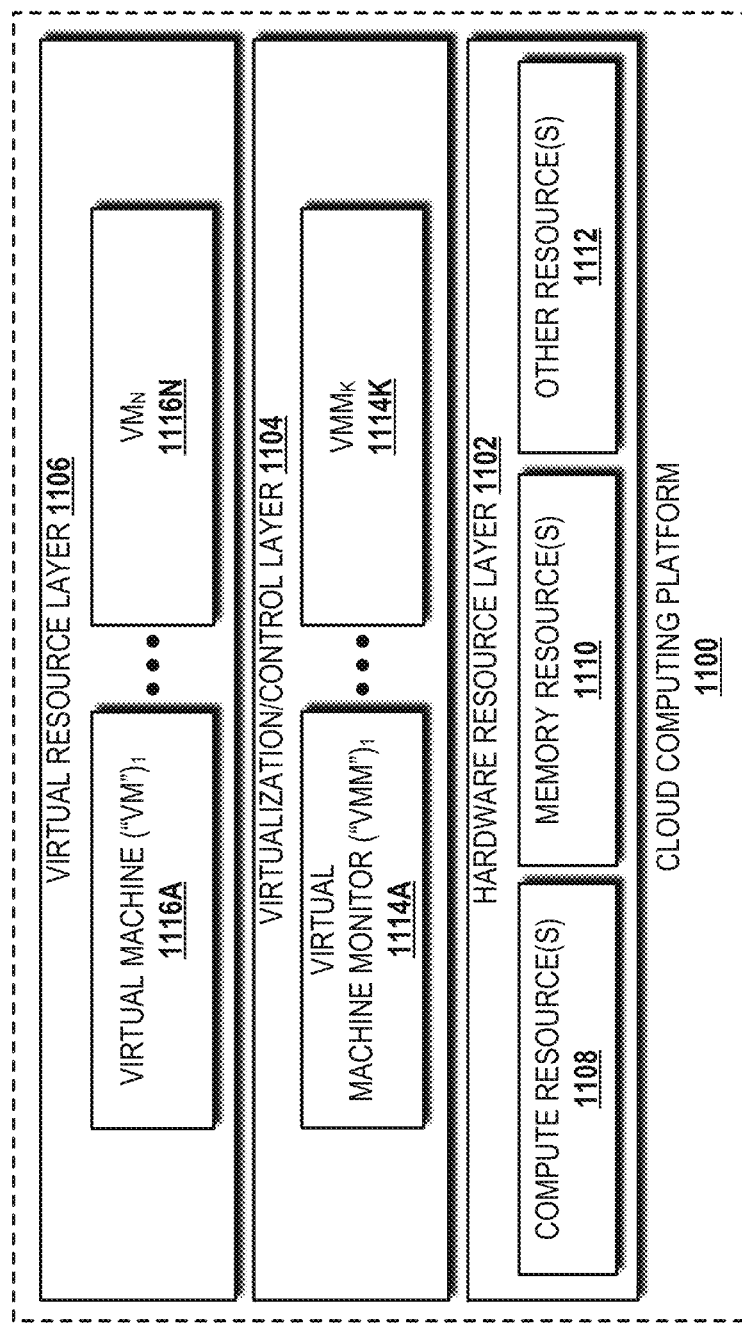
FIG. 11 is a diagram illustrating a cloud computing platform capable of implementing aspects of the embodiments disclosed herein.

Turning now to FIG. 11, a cloud computing platform 1100 will be described, according to an exemplary embodiment. In some embodiments, the server 102, one or more of the CDNs 104 or systems thereof, and/or the PDN 106 or systems thereof can utilize an architecture the same as or similar to the cloud computing platform 1100 to implement various elements disclosed herein. The cloud computing platform 1100 is a shared infrastructure that can support multiple services and network applications. The illustrated cloud computing platform 1100 includes a hardware resource layer 1102, a virtualization/control layer 1104, and a virtual resource layer 1106 that work together to perform operations as will be described in detail herein.

The hardware resource layer 1102 provides hardware resources, which, in the illustrated embodiment, include one or more compute resources 1108, one or more memory resources 1110, and one or more other resources 1112. The compute resource(s) 1108 can include one or more hardware components that perform computations to process data, and/or to execute computer-executable instructions of one or more application programs, operating systems, and/or other software. The compute resources 1108 can include one or more central processing units ("CPUs") configured with one or more processing cores. The compute resources 1108 can include one or more graphics processing unit ("GPU")

configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1108 can include one or more discrete GPUs. In some other embodiments, the compute resources 1108 can include CPU and GPU components that are configured in accordance with a co-processing CPU/GPU computing model, wherein the sequential part of an application executes on the CPU and the computationally-intensive part is accelerated by the GPU. The compute resources 1108 can include one or more system-on-chip ("SoC") components along with one or more other components, including, for example, one or more of the memory resources 1110, and/or one or more of the other resources 1112. In some embodiments, the compute resources 1108 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1108 can be or can include one or more hardware components architected in accordance with an advanced reduced instruction set computing ("RISC") ("ARM") architecture, available for license from ARM HOLDINGS of Cambridge, United Kingdom. Alternatively, the compute resources 1108 can be or can include one or more hardware components architected in accordance with an x86 architecture, such an architecture available from INTEL CORPORATION of Mountain View, Calif., and others. Those skilled in the art will appreciate the implementation of the compute resources 1108 can utilize various computation architectures, and as such, the compute resources 1108 should not be construed as being limited to any particular computation architecture or combination of computation architectures, including those explicitly disclosed herein.

The memory resource(s) 1110 can include one or more hardware components that perform storage operations, including temporary or permanent storage operations. In some embodiments, the memory resource(s) 1110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1108.

The other resource(s) 1112 can include any other hardware resources that can be utilized by the compute resources (s) 1108 and/or the memory resource(s) 1110 to perform operations described herein. The other resource(s) 1112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1102 can be virtualized by one or more virtual machine monitors ("VMMs") 1114A-1114K (also known as "hypervisors;" hereinafter "VMMs 1114") operating within the virtualization/control layer 1104 to manage one or more virtual resources that reside in the virtual resource layer 1106. The VMMs 1114 can be or can include software, firmware, and/or hardware that alone or in combination with other software, firmware, and/or hardware, manages one or more virtual resources operating within the virtual resource layer 1106.

The virtual resources operating within the virtual resource layer 1106 can include abstractions of at least a portion of the compute resources 1108, the memory resources 1110, the other resources 1112, or any combination thereof. These abstractions are referred to herein as VMs. In the illustrated embodiment, the virtual resource layer 1106 includes VMs 1116A-1116N (hereinafter "VMs 1116"). Each of the VMs 1116 can execute one or more applications to perform the operations described herein.

Figure 12:
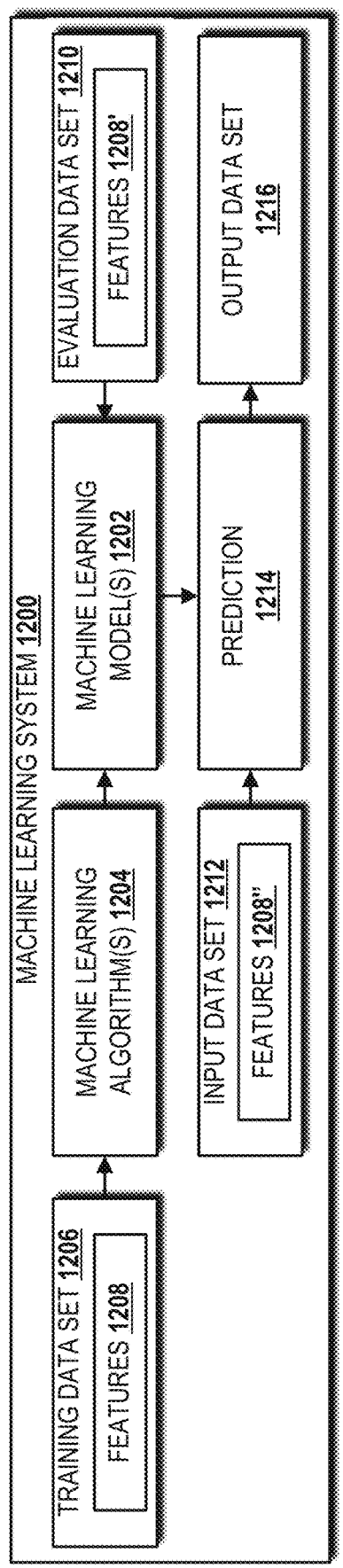
FIG. 12 is a diagram illustrating a machine learning system, according to an illustrative embodiment.

Turning now to FIG. 12, a machine learning system 1200 capable of implementing aspects of the embodiments disclosed herein will be described. As described above with reference to FIG. 1B, the CDN manager 108 can include the image processor 138, which can execute the ML algorithm 140 to process the web page images 136. In some embodiments, the CDN manager 108, and particularly the image processor 138, can utilize the machine learning system 1200 to implement the ML algorithm 140. The server 102 that executes the CDN manager 108 may include the machine learning system 1200 or may communicate with the machine learning system 1200 that is operating remotely from the server 102.

The illustrated machine learning system 1200 includes one or more machine learning models 1202. The machine learning models 1202 can include supervised and/or semi-supervised learning models. The machine learning model(s) 1202 can be created by the machine learning system 1200 based upon one or more machine learning algorithms 1204, such as the ML algorithm 140. The machine learning algorithm(s) 1204 can be any existing, well-known algorithm, any proprietary algorithms, or any future machine learning algorithm. Some example machine learning algorithms 1204 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1204 based upon the problem (s) to be solved by machine learning via the machine learning system 1200.

The machine learning system 1200 can control the creation of the machine learning models 1202 via one or more training parameters. In some embodiments, the training parameters are selected modelers at the direction of an enterprise, for example. Alternatively, in some embodiments, the training parameters are automatically selected based upon data provided in one or more training data sets 1206. The training parameters can include, for example, a learning rate, a model size, a number of training passes, data shuffling, regularization, and/or other training parameters known to those skilled in the art. The training data in the training data sets 1206.

The learning rate is a training parameter defined by a constant value. The learning rate affects the speed at which the machine learning algorithm 1204 converges to the optimal weights. The machine learning algorithm 1204 can update the weights for every data example included in the training data set 1206. The size of an update is controlled by the learning rate. A learning rate that is too high might prevent the machine learning algorithm 1204 from converging to the optimal weights. A learning rate that is too low might result in the machine learning algorithm 1204 requiring multiple training passes to converge to the optimal weights.

The model size is regulated by the number of input features ("features") 1208 in the training data set 1206. A greater the number of features 1208 yields a greater number of possible patterns that can be determined from the training data set 1206. The model size should be selected to balance the resources (e.g., compute, memory, storage, etc.) needed for training and the predictive power of the resultant machine learning model 1202.

The number of training passes indicates the number of training passes that the machine learning algorithm 1204 makes over the training data set 1206 during the training process. The number of training passes can be adjusted based, for example, on the size of the training data set 1206, with larger training data sets being exposed to fewer training passes in consideration of time and/or resource utilization. The effectiveness of the resultant machine learning model 1202 can be increased by multiple training passes.

Data shuffling is a training parameter designed to prevent the machine learning algorithm 1204 from reaching false optimal weights due to the order in which data contained in the training data set 1206 is processed. For example, data provided in rows and columns might be analyzed first row, second row, third row, etc., and thus an optimal weight might be obtained well before a full range of data has been considered. By data shuffling, the data contained in the training data set 1206 can be analyzed more thoroughly and mitigate bias in the resultant machine learning model 1202.

Regularization is a training parameter that helps to prevent the machine learning model 1202 from memorizing training data from the training data set 1206. In other words, the machine learning model 1202 fits the training data set 1206, but the predictive performance of the machine learning model 1202 is not acceptable. Regularization helps the machine learning system 1200 avoid this overfitting/memorization problem by adjusting extreme weight values of the features 1208. For example, a feature that has a small weight value relative to the weight values of the other features in the training data set 1206 can be adjusted to zero.

The machine learning system 1200 can determine model accuracy after training by using one or more evaluation data sets 1210 containing the same features 1208' as the features 1208 in the training data set 1206. This also prevents the machine learning model 1202 from simply memorizing the data contained in the training data set 1206. The number of evaluation passes made by the machine learning system 1200 can be regulated by a target model accuracy that, when reached, ends the evaluation process and the machine learning model 1202 is considered ready for deployment.

After deployment, the machine learning model 1202 can perform a prediction operation ("prediction") 1214 with an input data set 1212 having the same features 1208" as the features 1208 in the training data set 1206 and the features 1208' of the evaluation data set 1210. The results of the prediction 1214 are included in an output data set 1216 consisting of predicted data. The machine learning model 1202 can perform other operations, such as regression, classification, and others. As such, the example illustrated in FIG. 12 should not be construed as being limiting in any way.

Based on the foregoing, it should be appreciated that concepts and technologies for security mechanisms for CDNs have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
   receiving, by a content delivery network ("CDN") manager executed by a processor of a server, a plurality of hypertext transfer protocol ("HTTP") requests;
   parsing, by the CDN manager, a plurality of headers from the plurality of HTTP requests to determine a plurality uniform resource locators ("URLs");
   generating, by the CDN manager, a plurality of web page images associated with the plurality of URLs;
   executing, by the CDN manager, a machine learning algorithm to perform an analysis of the plurality of web page images; and
   determining, by the CDN manager, based upon the analysis of the plurality of web page images, whether the plurality of HTTP requests are for a same web page.

2. The method of claim 1, further comprising, in response to determining, by the CDN manager, based upon the analysis of the plurality of web page images, that the plurality of HTTP requests are for the same web page, determining, by the CDN manager, that the HTTP requests are malicious.

3. The method of claim 2, further comprising providing, by the CDN manager, a web page code associated with the plurality of web page images into a hash function to create a hashed web page code.

4. The method of claim 3, further comprising:
   distributing, by the CDN manager, the hashed web page code to a CDN; and
   separately distributing, by the CDN manager, the hash function to the CDN.

5. The method of claim 1, further comprising, in response to determining, by the CDN manager, based upon the analysis of the plurality of web page images, that the plurality of HTTP requests are for different web pages, determining, by the CDN manager, that the HTTP requests are legitimate.

6. The method of claim 1, wherein receiving, by the CDN manager, the plurality of HTTP requests comprises receiving, by the CDN manager, the plurality of HTTP requests redirected from at least one CDN.

7. The method of claim 1, further comprising executing, by the CDN manager, a user device simulator to simulate a user device to access the plurality of URLs identified in the plurality of HTTP requests; and wherein generating, by the CDN manager, the plurality of web page images associated with the plurality of URLs comprises causing, by the CDN manager, the user device simulator to generate the plurality of web page images associated with the plurality of URLs.

8. A system comprising:
a processor; and
a memory comprising instructions of a content delivery network ("CDN") manager that, when executed by the processor, cause the processor to perform operations comprising
receiving a plurality of hypertext transfer protocol ("HTTP") requests,
parsing a plurality of headers from the plurality of HTTP requests to determine a plurality uniform resource locators ("URLs"),
generating a plurality of web page images associated with the plurality of URLs,
executing a machine learning algorithm to perform an analysis of the plurality of web page images, and
determining, based upon the analysis of the plurality of web page images, whether the plurality of HTTP requests are for a same web page.

9. The system of claim 8, wherein the operations further comprise, in response to determining, based upon the analysis of the plurality of web page images, that the plurality of HTTP requests are for the same web page, determining that the HTTP requests are malicious.

10. The system of claim 9, wherein the operations further comprise providing a web page code associated with the plurality of web page images into a hash function to create a hashed web page code.

11. The system of claim 10, wherein the operations further comprise:
distributing the hashed web page code to a CDN; and
separately distributing the hash function to the CDN.

12. The system of claim 8, wherein the operations further comprise, in response to determining, based upon the analysis of the plurality of web page images, that the plurality of HTTP requests are for different web pages, determining that the HTTP requests are legitimate.

13. The system of claim 8, wherein receiving the plurality of HTTP requests comprises receiving the plurality of HTTP requests redirected from at least one CDN.

14. The system of claim 8, wherein the operations further comprise executing a user device simulator to simulate a user device to access the plurality of URLs identified in the plurality of HTTP requests; and wherein generating the plurality of web page images associated with the plurality of URLs comprises causing the user device simulator to generate the plurality of web page images associated with the plurality of URLs.

15. A computer-readable storage medium comprising computer-executable instructions that, when executed by a processor, cause the processor to perform operations comprising:
receiving a plurality of hypertext transfer protocol ("HTTP") requests;
parsing a plurality of headers from the plurality of HTTP requests to determine a plurality uniform resource locators ("URLs");
generating a plurality of web page images associated with the plurality of URLs;
executing a machine learning algorithm to perform an analysis of the plurality of web page images; and
determining, based upon the analysis of the plurality of web page images, whether the plurality of HTTP requests are for a same web page.

16. The computer-readable storage medium of claim 15, wherein the operations further comprise, in response to determining, based upon the analysis of the plurality of web page images, that the plurality of HTTP requests are for the same web page, determining that the HTTP requests are malicious.

17. The computer-readable storage medium of claim 16, wherein the operations further comprise providing a web page code associated with the plurality of web page images into a hash function to create a hashed web page code.

18. The computer-readable storage medium of claim 17, wherein the operations further comprise:
distributing the hashed web page code to a CDN; and
separately distributing the hashed web page code to the CDN.

19. The computer-readable storage medium of claim 15, wherein the operations further comprise, in response to determining, based upon the analysis of the plurality of web page images, that the plurality of HTTP requests are for different web pages, determining that the HTTP requests are legitimate.

20. The computer-readable storage medium of claim 15, wherein the operations further comprise executing a user device simulator to simulate a user device to access the plurality of URLs identified in the plurality of HTTP requests; and wherein generating the plurality of web page images associated with the plurality of URLs comprises causing the user device simulator to generate the plurality of web page images associated with the plurality of URLs.

* * * * *